United States Patent
Yang et al.

(10) Patent No.: US 8,399,542 B2
(45) Date of Patent: Mar. 19, 2013

(54) METHOD FOR MAKING A POLY-LACTIC ACID/SILICA COMPOSITE

(75) Inventors: Cheng-Chien Yang, Taoyuan County (TW); Jui-Ming Yeh, Taoyuan County (TW); Tsao-Cheng Huang, Taoyuan County (TW)

(73) Assignee: Chung-Shan Institute of Science and Technology, Armaments, Bureau, Ministry of National Defense, Longtan Township (TW)

( * ) Notice: Subject to any disclaimer, the term of this patent is extended or adjusted under 35 U.S.C. 154(b) by 51 days.

(21) Appl. No.: 13/194,125

(22) Filed: Jul. 29, 2011

(65) Prior Publication Data

US 2013/0030107 A1    Jan. 31, 2013

(51) Int. Cl.
*C08K 9/06* (2006.01)
*C07F 7/18* (2006.01)

(52) U.S. Cl. ........................... 523/212; 524/188
(58) Field of Classification Search .............. 524/188; 523/212

See application file for complete search history.

(56) References Cited

U.S. PATENT DOCUMENTS

| 5,985,953 | A  | * | 11/1999 | Lightsey et al. | 523/212 |
| 2006/0178452 | A1 | * | 8/2006 | Hoefler | 523/212 |
| 2009/0169844 | A1 | * | 7/2009 | Yamamura et al. | 428/213 |

* cited by examiner

*Primary Examiner* — Ling Choi
*Assistant Examiner* — John Uselding
(74) *Attorney, Agent, or Firm* — Jackson IPG PLLC

(57) ABSTRACT

Disclosed is a method for making a poly-lactic acid/silica composite. At first, silica particles are aminated, thus providing aminated silica particles. Secondly, the aminated silica particles are mixed with poly-lactic acid. Then, the mixture is blended and extruded by two micro-screws, thus providing a poly-lactic acid/silica composite. Thus, the mechanical properties of the poly-lactic acid are improved without affecting the biodegradability of the poly-lactic acid.

7 Claims, 3 Drawing Sheets

METHOD FOR MAKING A POLY-LACTIC ACID/SILICA COMPOSITE

BACKGROUND OF INVENTION

1. Field of Invention

The present invention relates to a method for making a poly-lactic acid/silica composite and, more particularly, to a method for providing a poly-lactic acid/silica composite with excellent mechanical properties without affecting the biodegradability.

2. Related Prior Art

As the time advances, various plastics, composites and polymers have been developed. However, the development of the polymers entails a huge amount of materials that cannot be biodegraded in the environment. This huge amount of un-biodegradable polymers imposes a grave threat for the environment and therefore our life. In 1980s, the global demand for plastics reached 200 million tons. It consumes a lot of resources to incinerate or burry plastic waste since most of it is un-biodegradable. Moreover, the incineration of plastic waste results in the emission of the greenhouse gas that causes the global warming.

Conventional plastics such as polyester ("PET"), nylon, acrylics and polypropylene ("PP") exhibit excellent physical properties; however, they pollute the environment since they cannot be degraded fast. Poly-lactic acid ("PLA") is a biodegradable polymer that can be used without imposing a grave problem to the environment; however it exhibits dissatisfactory physical properties. The glass transition temperature of poly-lactic acid is about 60° C., and the melting point of poly-lactic acid is about 170° C. Obviously, the thermal properties of poly-lactic acid are inadequate to encourage replacement of the conventional polymers with poly-lactic acid.

Inorganic materials may be added to polymers to enhance the physical and thermal properties of the polymers. Conventionally, inorganic silica is mixed with polymers without providing chemical bonds between the silica and the polymers.

The present invention is therefore intended to obviate or at least alleviate the problems encountered in prior art.

SUMMARY OF INVENTION

It is the primary objective of the present invention to provide a method for making a poly-lactic acid/silica composite with excellent mechanical properties without affecting the biodegradability.

To achieve the foregoing objective, the method includes the step of aminating silica particles to provide aminated silica particles and the step of mixing the aminated silica particles with poly-lactic acid and extruding the mixture with two micro-screws to provide the poly-lactic acid/silica composite.

The step of aminating the silica particles may include the step of mixing the silica particles with methyl containing silane and amino containing silane;, the step of adding a surfactant to the mixture; the step of executing a sol-gel process via acid or alkali catalysis to provide the aminated silica particles, and the step of washing and drying the aminated silica particles.

The diameter of the silica particles is 2 μm to 100 nm. The ratio of the methyl containing silane over the amino containing silane is 2:1 to 40:1.

The surfactant may be a non-ionic or anion surfactant.

The method acid catalysis may be executed by using acetic acid or hydrochloric acid to reduce the pH of the mixture to a value lower than 7 to facilitate the sol-gel process.

The alkali catalysis may be executed by using ammonia or sodium carbonate solution to increase the pH of the mixture to a value higher than 7 to facilitate the sol-gel process.

The weight of the aminated silica particles is 1% to 7% of the weight of the poly-lactic acid.

The aminated silica particles are evenly distributed in the poly-lactic acid in the poly-lactic acid/silica composite.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
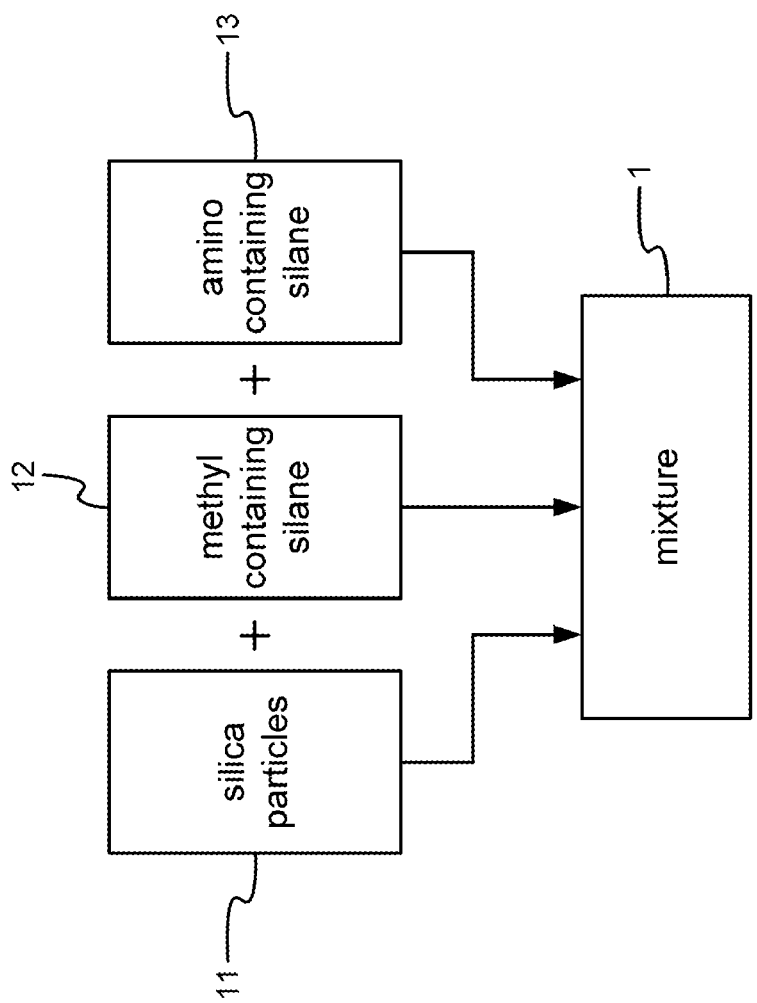
FIG. 1 is a block diagram of a process for making a mixture for use in a method for providing a poly-lactic acid/silica composite with excellent mechanical properties without affecting the biodegradability according to the preferred embodiment of the present invention.
Figure 2:
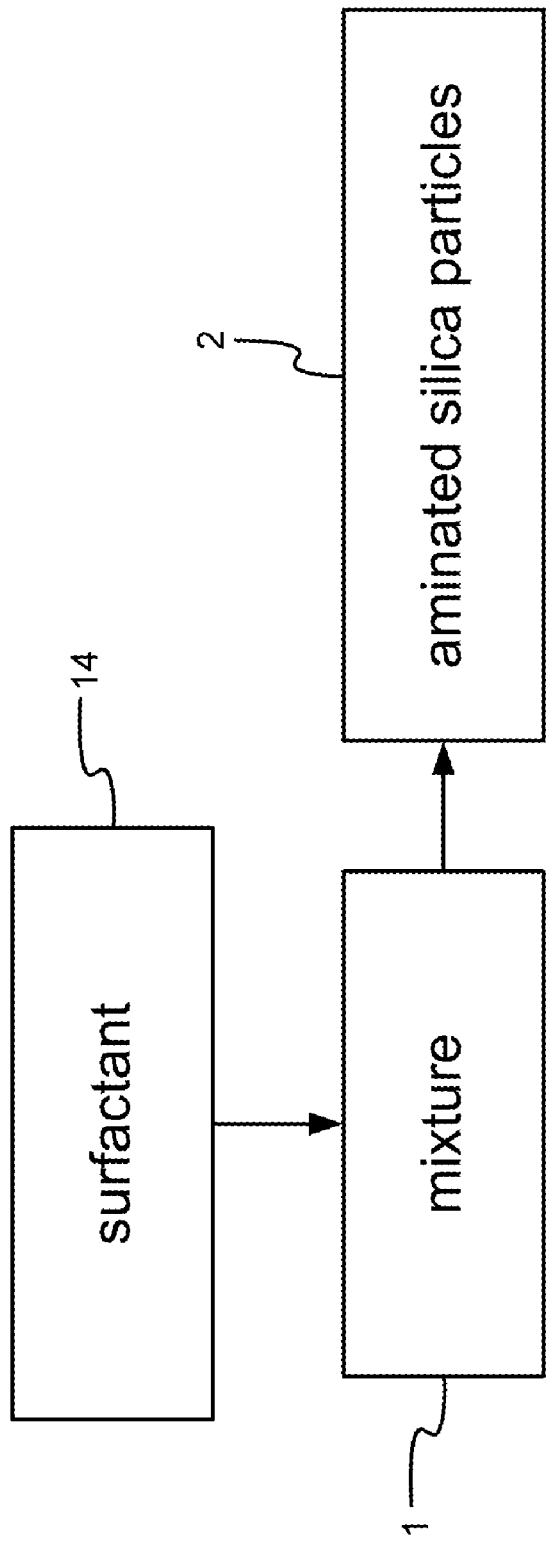
FIG. 2 is a block diagram of a process for making aminated silica particles from the mixture made in the process shown in FIG. 1.
Figure 3:
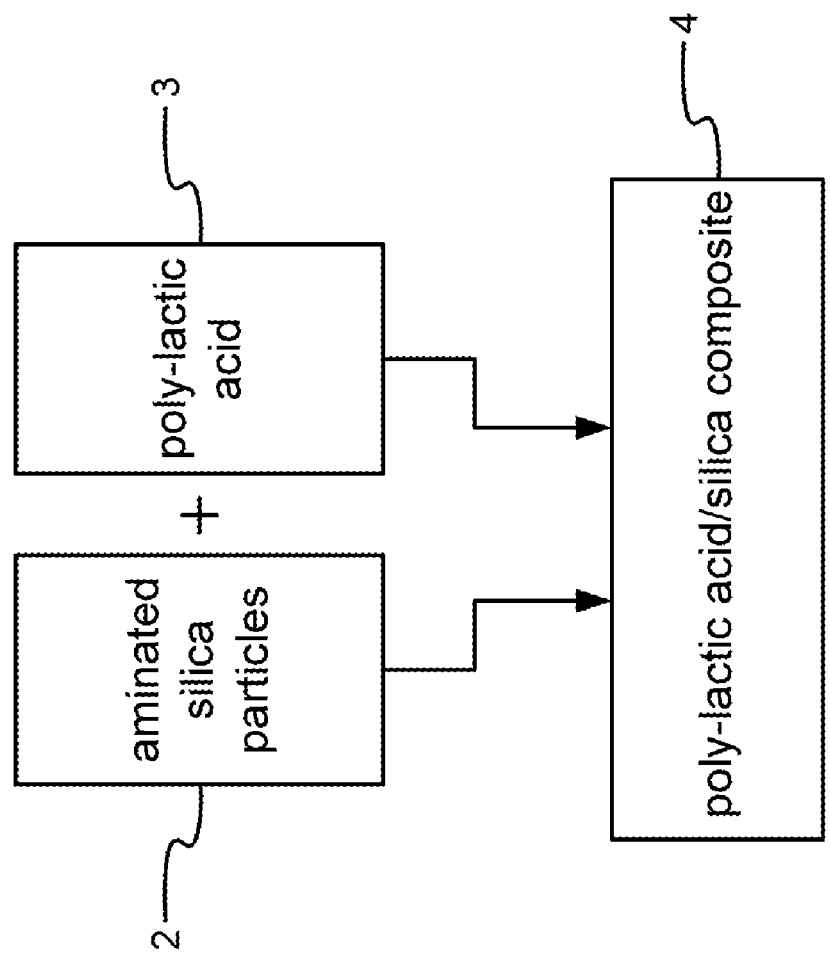
FIG. 3 is a block diagram of a process for making a poly-lactic acid/silica composite from the aminated silica particles made in the process of FIG. 2.

Referring to FIGS. 1 through 3, there is shown a method for providing a poly-lactic acid/silica composite with excellent mechanical properties without affecting the biodegradability according to the preferred embodiment of the present invention. Referring to FIG. 1, silica particles 11 are provided with a diameter of 2 μm to 100 nm. The silica particles 11 are mixed with methyl containing silane 12 and amino containing silane 13, thus providing a mixture 1. The ratio of the methyl containing silane 12 over amino containing silane 13 is 2:1 to 40:1.

Referring to FIG. 2, a surfactant 14 is added to the mixture 1. The surfactant 14 may be a non-ionic surfactant or an anion surfactant for example. By acid or alkali catalysis, a sol-gel process is executed to provide aminated silica particles 2. Then, the aminated silica particles 2 are washed and dried. Where acid catalysis is executed, acetic acid or hydrochloric acid is used to reduce the pH of the mixture to a proper value lower than 7 to facilitate the sol-gel process. Where alkali catalysis is executed, ammonia or sodium carbonate solution is used to increase the pH of the mixture to a proper value higher than 7 to facilitate the sol-gel process.

Referring to FIG. 3, the aminated silica particles 2 are mixed with poly-lactic acid 3. Two micro-screws are used to stir and extrude the mixture, thus providing a poly-lactic acid/silica composite 4. The weight of the silica particles 2 is about 1% to 7% of the weight of poly-lactic acid 3. The aminated silica particles 2 are evenly distributed in the poly-lactic acid 3 in the poly-lactic acid/silica composite 4.

After the making of the poly-lactic acid/silica composite 4, the poly-lactic acid/silica composite 4 is tested regarding the mechanical properties, thermal properties and bio-degradability. The mechanical properties are increased by 47% at most. The pyrolysis temperature is increased by about 8° C. With respect to the biodegradability, the poly-lactic acid/silica composite 4 is tested at different pH values. It is learned that, the biodegradation gets faster as the pH values get lower.

The addition of the silica particles 11 in the poly-lactic acid 3 does not affect the biodegradability of the poly-lactic acid 3. Hence, the method of the present invention exhibits at least the following advantages:

1. The raw materials are pure;
2. Most of the precursors are liquid and the reaction temperatures are mostly lower than 200° C.;
3. The mixture is molecular mixture, not ordinary physical mixture, so that the risks of phase separation are low;
4. Most of the products are homogeneous, transparent materials with optical properties suitable for new optical applications;
5. The concentrations of the organic and inorganic molecules can be controlled to control the properties of the composite so that the composite exhibits the properties of organic polymers and inorganic oxides; and
6. Problems with conventional inorganic glass with a porosity that gets higher with the reaction temperature are avoided.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a poly-lactic acid/silica composite, the method including the steps of:
    aminating silica particles, thus providing aminated silica particles; and
    mixing the aminated silica particles with poly-lactic acid and extruding the mixture with two micro-screws, thus providing the poly-lactic acid/silica composite,
    wherein the step of aminating the silica particles includes the steps of:
        mixing the silica particles with methyl containing silane and amino containing silane;
        adding a surfactant to the mixture;
        executing a sol-gel process via acid or alkali catalysis to provide the aminated silica particles; and
        washing and drying the aminated silica particles,
        wherein the ratio of the methyl containing silane over the amino containing silane is 2:1 to 40:1.

2. The method according to claim 1, wherein the diameter of the silica particles is 2 µm to 100 nm.

3. The method according to claim 1, wherein the surfactant is selected from the group consisting of non-ionic surfactants and anion surfactants.

4. The method according to claim 1, wherein the acid catalysis is executed by using acetic acid or hydrochloric acid to reduce the pH of the mixture to a value lower than 7 to facilitate the sol-gel process.

5. The method according to claim 1, wherein the alkali catalysis is executed by using ammonia or sodium carbonate solution to increase the pH of the mixture to a value higher than 7 to facilitate the sol-gel process.

6. The method according to claim 1, wherein the weight of the aminated silica particles is 1% to 7% of the weight of the poly-lactic acid.

7. The method according to claim 1, wherein aminated silica particles are evenly distributed in the poly-lactic acid in the poly-lactic acid/silica composite.

* * * * *